US012687448B1

(12) United States Patent　　(10) Patent No.:　US 12,687,448 B1
Labach　　(45) Date of Patent:　　Jul. 21, 2026

(54) METHODS, SYSTEMS, AND DEVICES FOR DETECTING AND LOCATING FLUID LEAKS ALONG A RESISTANCE CABLE

(71) Applicant: Parameter LLC, Fort Collins, CO (US)

(72) Inventor: Frederick Avery Labach, Raleigh, NC (US)

(73) Assignee: Parameter LLC, Fort Collins, CO (US)

( * ) Notice: Subject to any disclaimer, the term of this patent is extended or adjusted under 35 U.S.C. 154(b) by 0 days.

(21) Appl. No.: 19/361,383

(22) Filed: Oct. 17, 2025

(51) Int. Cl.
　　*G01B 7/02*　　(2006.01)
　　*G01M 3/16*　　(2006.01)
(52) U.S. Cl.
　　CPC ............... *G01M 3/165* (2013.01); *G01B 7/02* (2013.01)
(58) Field of Classification Search
　　CPC ........... G01N 2001/2285; G01Q 70/16; G01R 1/06711; G01R 1/07307
　　See application file for complete search history.

(56) References Cited

U.S. PATENT DOCUMENTS

2006/0042358 A1 * 3/2006 Von Gutfeld ........... G01M 3/04
　　　　　　　　　　　　　　　　　73/40
2014/0210603 A1 * 7/2014 Walser ................... G01R 27/02
　　　　　　　　　　　　　　　　　324/691

FOREIGN PATENT DOCUMENTS

EP　　0144211 A2　6/1985
JP　　3185003 B2　7/2001
JP　　2003114161 A　4/2003

OTHER PUBLICATIONS

EPO, Extended European Search Report for European Patent Application No. 25211084.6, Apr. 20, 2026, 8 pages.

* cited by examiner

*Primary Examiner* — Tung X Nguyen
(74) *Attorney, Agent, or Firm* — NK Patent Law

(57)　　　　　　ABSTRACT

Disclosed herein are methods, systems, and devices for detecting and locating fluid leaks along a resistance cable. According to one embodiment, a system for monitoring a sense cable that comprises a source wire and a resistance wire is disclosed. The system includes control circuitry and current measurement circuitry coupled with the control circuitry. The control circuitry is configured for determining a first current value of a first measured leak current at a near end of the resistance wire and determining a second current value of a second measured leak current at a far end of the resistance wire. The control circuitry is further configured for determining an approximate location of a leak coupling via a fluid between the source wire and the resistance wire based on the first current value, the second current value, and a resistance parameter of the resistance wire.

21 Claims, 14 Drawing Sheets

MECHANICAL
DIAGRAM
100

106

102

104

DIAGRAM
200

SCHEMATIC
DIAGRAM
400

Leak Location  =  R1 * (V2 − V1) / (V1 * K)    [ meters ]

Leak Current   =  V1 / R1       [ amps ]

SCHEMATIC DIAGRAM
600

S1 -> V1:   Leak Location = R1 * (V2 – V1) / (V3 * K)    [ meters ]

S1 -> V2:   Leak Location = X - (R1 * (V1 - V2) / (V3 * K))    [ meters ]

Leak Current = V3 / R1    [ amps ]

SCHEMATIC
DIAGRAM
800

SCHEMATIC
DIAGRAM
900

FIG. 13

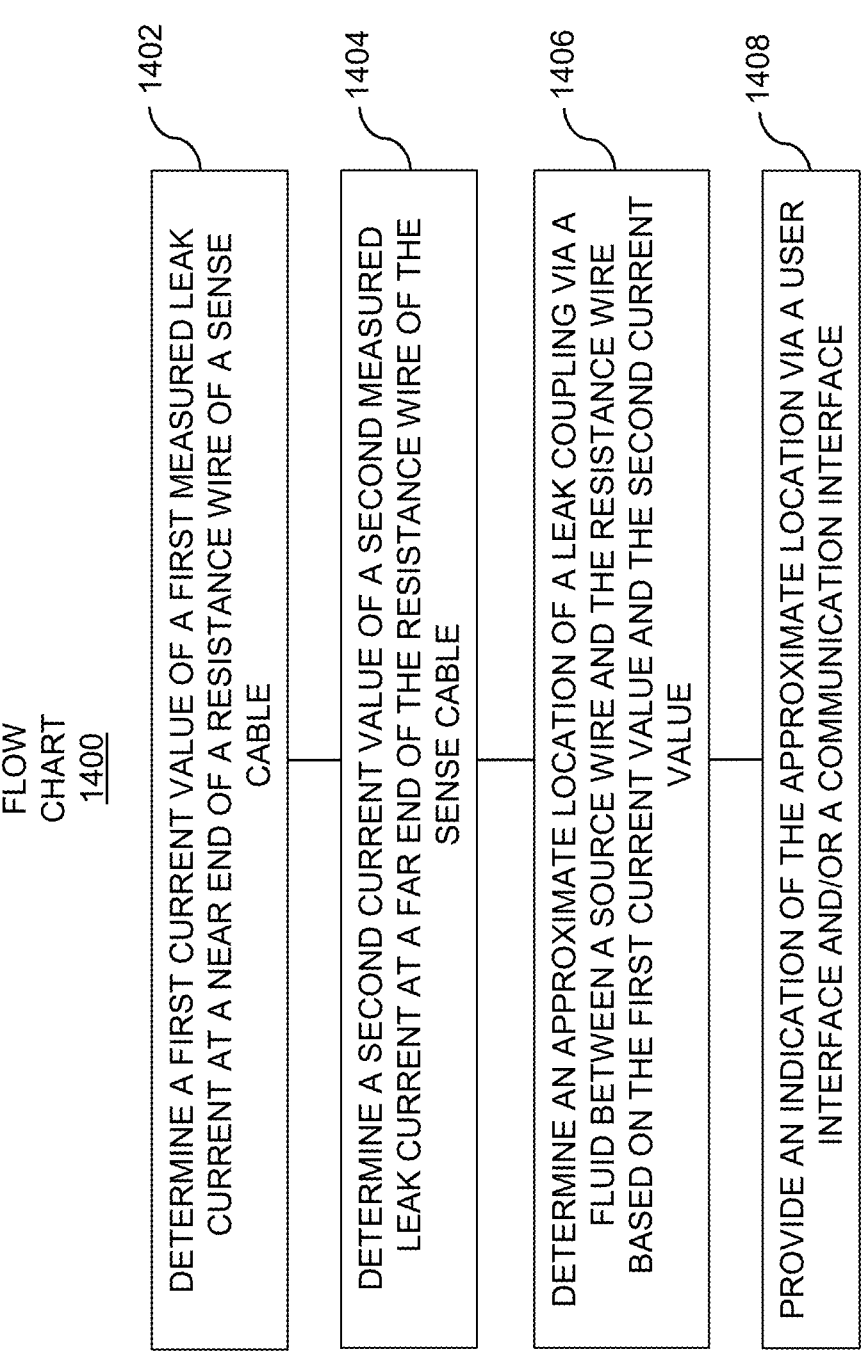

FLOW CHART 1400

1402 — DETERMINE A FIRST CURRENT VALUE OF A FIRST MEASURED LEAK CURRENT AT A NEAR END OF A RESISTANCE WIRE OF A SENSE CABLE

1404 — DETERMINE A SECOND CURRENT VALUE OF A SECOND MEASURED LEAK CURRENT AT A FAR END OF THE RESISTANCE WIRE OF THE SENSE CABLE

1406 — DETERMINE AN APPROXIMATE LOCATION OF A LEAK COUPLING VIA A FLUID BETWEEN A SOURCE WIRE AND THE RESISTANCE WIRE BASED ON THE FIRST CURRENT VALUE AND THE SECOND CURRENT VALUE

1408 — PROVIDE AN INDICATION OF THE APPROXIMATE LOCATION VIA A USER INTERFACE AND/OR A COMMUNICATION INTERFACE

FIG. 14

METHODS, SYSTEMS, AND DEVICES FOR DETECTING AND LOCATING FLUID LEAKS ALONG A RESISTANCE CABLE

TECHNICAL FIELD

The present invention relates generally to sensing devices. More specifically; improved methods, systems, and devices are disclosed for detecting and locating fluid leaks along a resistance sense cable.

BACKGROUND

Sense cables provide methods of detecting water leaks and other conductive fluid leaks. A sense cable can be positioned around the interior perimeter of an enclosure (e.g., a room, an equipment hut, etc.) and/or in a serpentine pattern under a floor. A sense cable typically includes at least two conducting wires separated by an insulating substance, such as a polymer. When water contacts the sense cable, the circuit is completed, allowing electricity to flow through the sense cable. A monitoring system that detects changes in electrical resistance is linked to the sense cable (i.e. the resistance between the two conducting wires of the sense cable changes when it comes into conduct with water and/or another conductive fluid.). The monitoring system then generates a notification or alarm. These monitoring systems with their associated sense cables can identify water leaks before they cause extensive harm. However, existing monitoring systems can have reduced location detection accuracy based on an actual location of the leak along the sense cable.

SUMMARY

Disclosed herein are improved methods, systems, and devices for detecting and locating fluid leaks along a sense cable. According to one embodiment, a system for monitoring a sense cable that comprises a source wire and a resistance wire is disclosed. The system includes control circuitry and current measurement circuitry coupled with the control circuitry. The control circuitry is configured for determining a first current value of a first measured leak current at a near end of the resistance wire and determining a second current value of a second measured leak current at a far end of the resistance wire. The control circuitry is further configured for determining an approximate location of a leak coupling via a fluid between the source wire and the resistance wire based on the first current value, the second current value, and a resistance parameter of the resistance wire. The approximate location may be a distance from the control circuitry and/or a percentage of a total sense cable length.

In another embodiment, a method implemented on at least one processor for monitoring a sense cable is disclosed. The sense cable includes a source wire and a resistance wire. The method includes determining a first current value of a first measured leak current at a near end of the resistance wire via current monitoring circuitry and determining a second current value of a second measured leak current at a far end of the resistance wire via the current monitoring circuitry. The method further includes determining an approximate location of a leak coupling via a fluid between the source wire and the resistance wire based on the first current value, the second current value, and a resistance parameter of the resistance wire. The approximate location may be a distance from the control circuitry and/or a percentage of a total sense cable length. Additionally, the method includes providing an indication of the approximate location via a user interface and/or a communication interface.

In another embodiment, a non-transitory computer-readable storage medium is disclosed. The non-transitory computer-readable storage medium stores instructions to be implemented by at least one processor. The instructions when executed by the at least one processor provide a method for monitoring a sense cable that comprises a source wire and a resistance wire. The method includes determining a first current value of a first measured leak current at a near end of the resistance wire via current monitoring circuitry and determining a second current value of a second measured leak current at a far end of the resistance wire via the current monitoring circuitry. The method further includes determining an approximate location of a leak coupling via a fluid between the source wire and the resistance wire based on the first current value, the second current value, and a resistance parameter of the resistance wire. The approximate location may be a distance from the control circuitry and/or a percentage of a total sense cable length. Additionally, the method includes providing an indication of the approximate location via a user interface and/or a communication interface.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The present embodiments are illustrated by way of example and are not intended to be limited by the figures of the accompanying drawings. In the drawings:

FIG. 13 depicts a block diagram illustrating a system including control circuitry for monitoring a sense cable in accordance with embodiments of the present disclosure FIG. 14 depicts a flowchart illustrating a method performed by the control circuitry of FIG. 13 in accordance with embodiments of the present disclosure.

DETAILED DESCRIPTION

Figure 1:
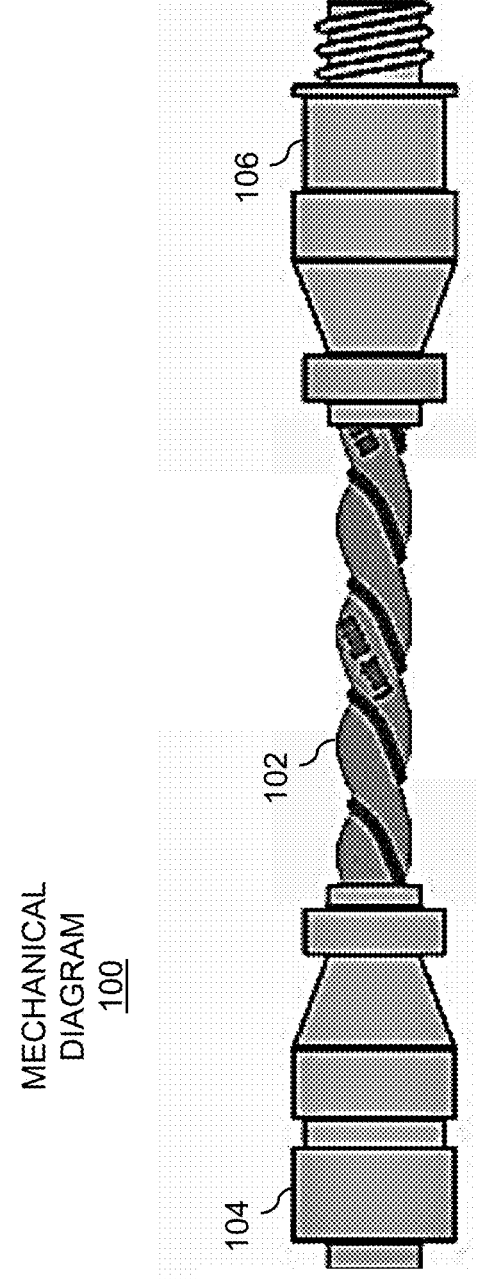
FIG. 1 depicts a mechanical diagram illustrating a sense cable (e.g., a typical commercial leak detection cable) in accordance with embodiments of the present disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1 depicts a mechanical diagram 100 illustrating a sense cable 102 (e.g., a typical commercial leak detection cable) in accordance with embodiments of the present disclosure. Typical lengths range from tens to hundreds of meters. The sense cable 102 includes mating style connectors 104 and 106. This allows multiple sense cables to be connected in series to increase the effective length for leak detection. Leak detection and location determination for conductive fluids using a resistance cable (e.g., the sense cable 102) is a well-established field with several active products and companies. Construction of these cables vary in detail but typically contain a pair of wires with either porous or no insulation which can make physical contact with a conductive fluid leak (e.g., a water leak). One wire is made from a high-resistance material (i.e. a resistance wire) such as nichrome, while the other wire is usually a standard copper wire (i.e. a source wire). An insulated copper return wire (i.e. a return wire) is included so that the resistance wire is effectively looped with both ends connected to an electronic circuit at one end of the cable (hereafter referred to as the near end, with the other end referred to as the far end). A current-limited voltage is applied between the source wire and the resistance wire. When a leak makes contact with the sense cable 102, it creates an electrical impedance between the resistance wire and the source wire allowing current to flow between them at the leak location. The magnitude of the leak current can be less than 10 microamps ($\mu$A), and a current limit is set to prevent signal saturation and/or circuit damage. The leak current induces a voltage along the resistance wire proportional to its physical location along the sense cable 102. The electronic circuit measures the voltages and currents available at the ends of the resistance wire loop and then determines whether a leak has occurred and the approximate physical location of that leak. The location determination is independent of the magnitude of the leak conductance itself.

Figure 2:
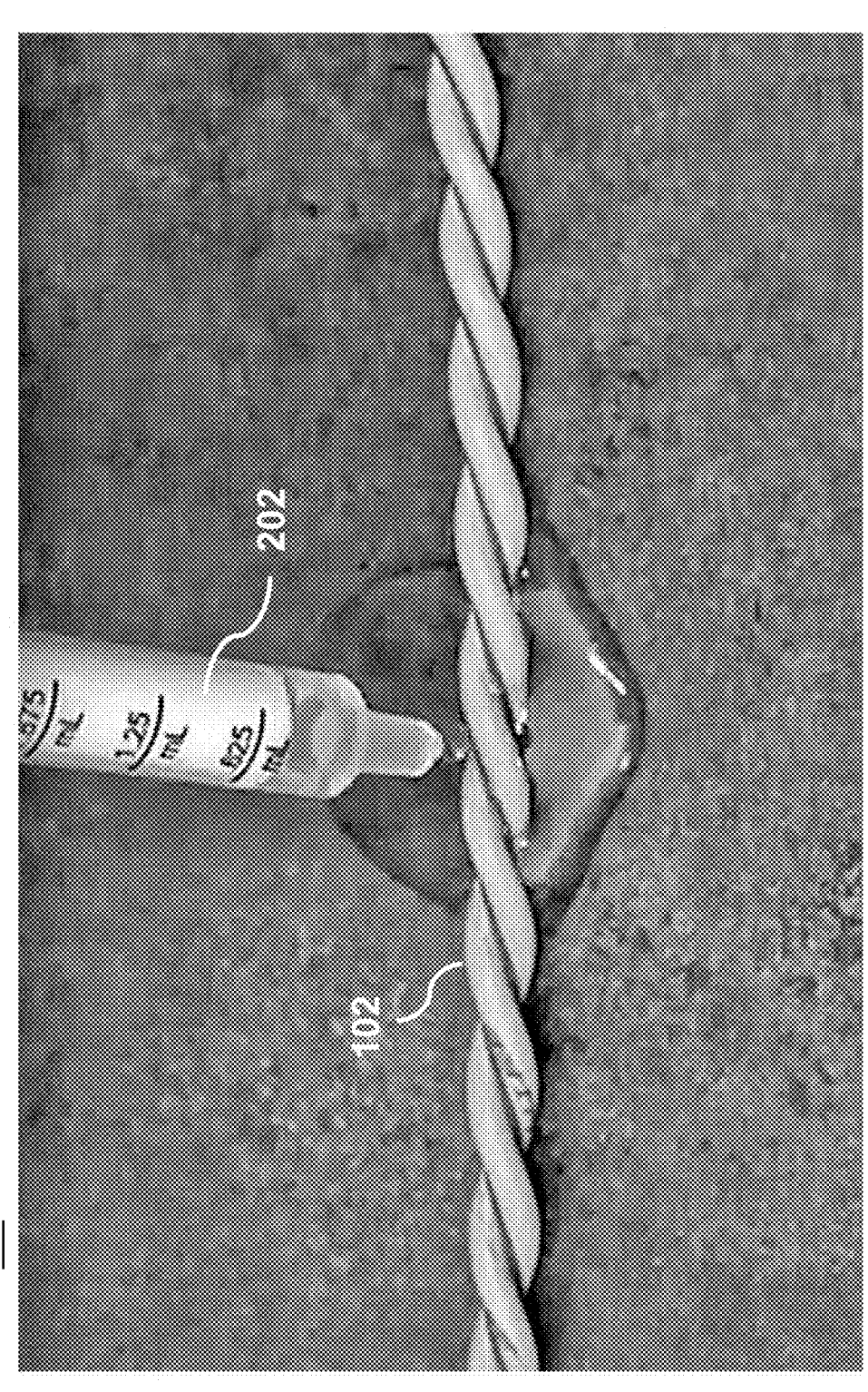
FIG. 2 depicts a diagram illustrating a traditional leak test applied by a syringe to the sense cable of FIG. 1 in accordance with embodiments of the present disclosure.

FIG. 2 depicts a diagram 200 illustrating a traditional leak test applied by a syringe 202 to the sense cable 102 of FIG. 1 in accordance with embodiments of the present disclosure. This traditional leak test involves measuring the leak current along one leg of the resistance wire while measuring the induced voltage differential between the two ends of that same wire. Leak current is measured at the near end by using a resistor to complete the circuit with the copper source wire and then measuring the voltage across that resistor. The leak current also induces a voltage between the near end of the resistance wire and the physical location of the leak. That voltage is determined by measuring the voltage between a near end and a far end of the resistance wire via the return wire using a high impedance device. This assumes that there is zero voltage differential (i.e., zero current) between the leak and the far end of the resistance wire. The value of the measured voltage divided by the leak current yields the resistance between the near end of the sense cable 102 and the leak. Since the wire's resistance-per-unit-length is known, the physical distance between the end of the sense cable 102 and the leak is then able to be computed. This traditional leak test is also applicable to the embodiments of this disclosure (including newly disclosed embodiments).

Figure 3:
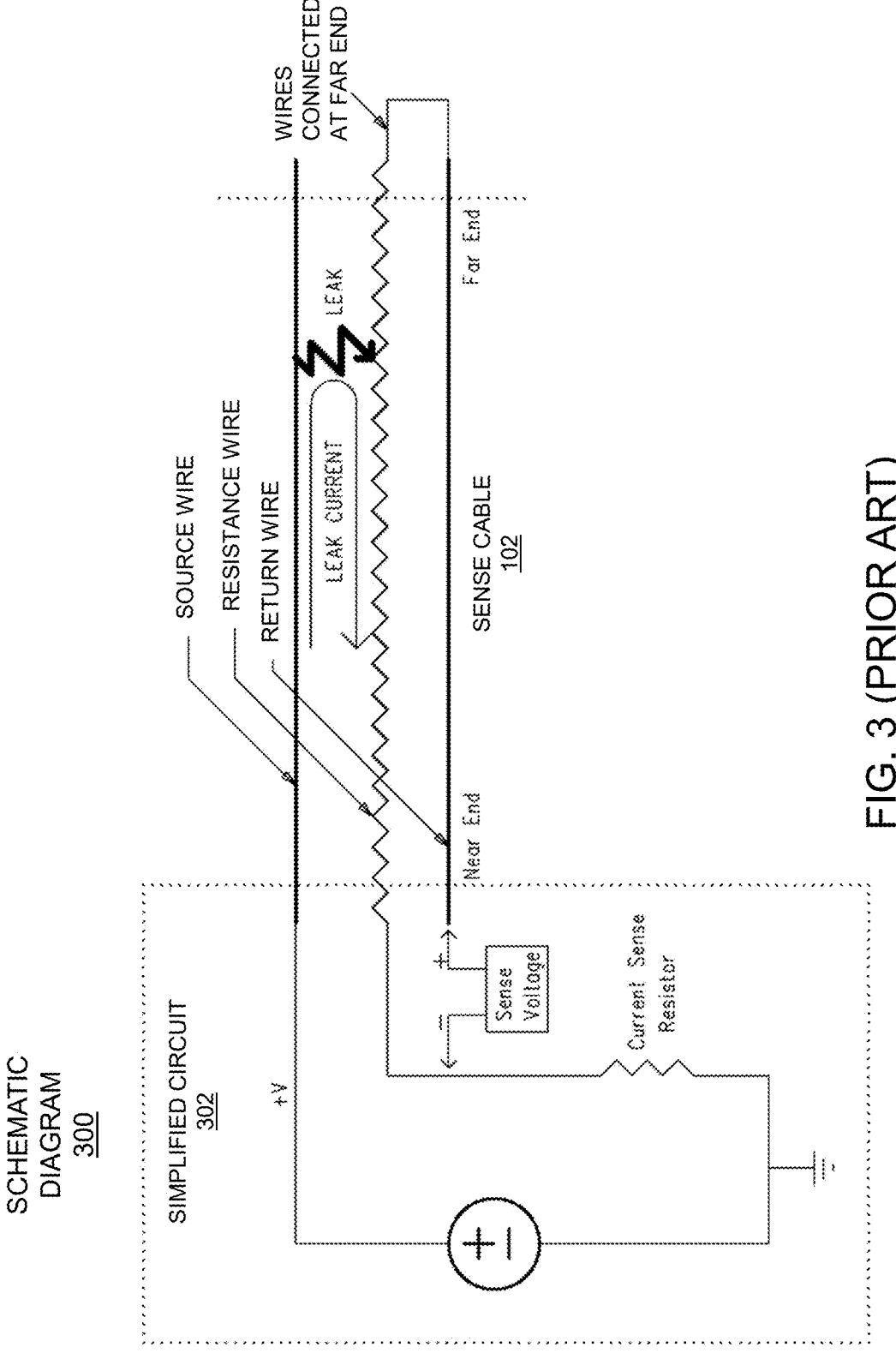
FIG. 3 depicts a schematic diagram illustrating a simplified circuit using a traditional method for determining a fluid leak contacting the sense cable of FIG. 1 in accordance with embodiments of the present disclosure.
Figure 4:
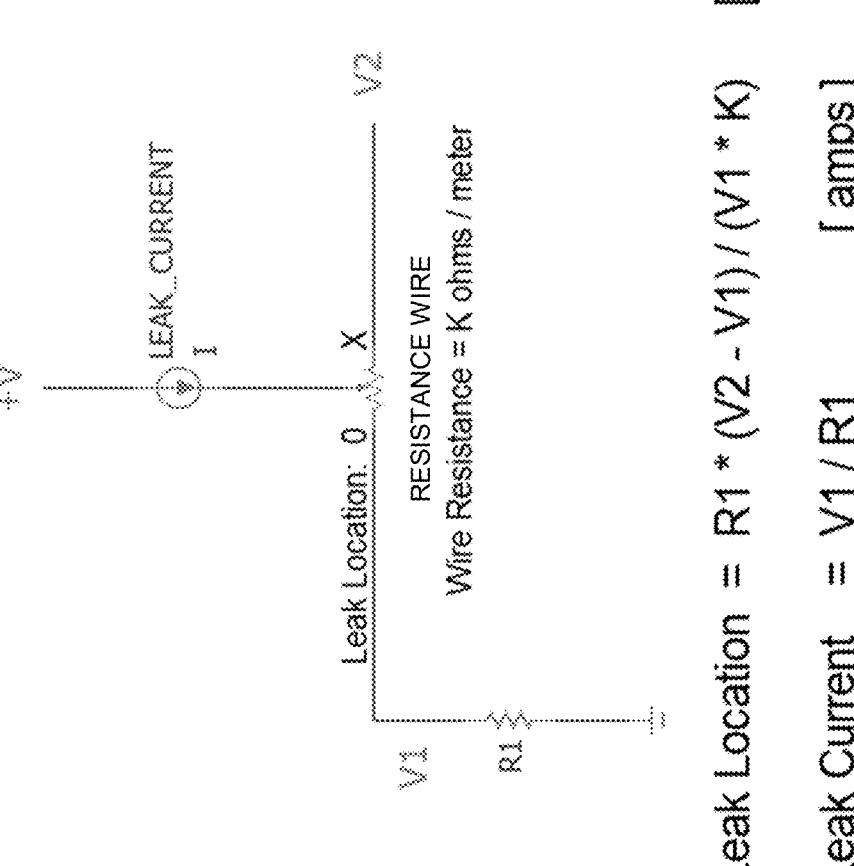
FIG. 4 depicts a schematic diagram illustrating a more detailed schematic representation of the traditional method of FIG. 3 in accordance with embodiments of the present disclosure.

FIG. 3 depicts a schematic diagram 300 illustrating a simplified circuit 302 using this traditional method for the sense cable 102 of FIG. 1 in accordance with embodiments of the present disclosure. FIG. 4 depicts a schematic diagram 400 illustrating a more detailed schematic representation of the traditional method of FIG. 3 in accordance with embodiments of the present disclosure. This traditional method is acceptable for detecting leaks over long distances (e.g., up to several kilometers on some existing products). Additionally, this traditional method is more accurate at determining leak locations closer to the far end of the sense cable 102 than at the near end. This is because the voltage V2 increases in proportion to the distance traversed by the leak current, while the error introduced by the voltage measurement current decreases in proportion to the distance it has to traverse. Conversely, as the leak location approaches the near end of the sense cable 102, the voltage signal becomes too small to measure reliably, and the error introduced by a parasitic voltage measurement current becomes both larger and more significant in relation to it. It is not uncommon to have a product specify a minimum distance of several meters before a leak can be reliably located.

Accurately measuring a wide range of distances requires a high resolution, high impedance analog-to-digital converter (ADC) with the ability to differentially measure the V2–V1 voltage directly without including ground. These requirements usually necessitate using a sigma-delta ADC with differential inputs, programmable gain, and either internal or external buffer amplifiers. These devices tend to be considerably more expensive than microcontrollers with integral single-ended successive-approximation (SAR) ADCs.

Figure 5:
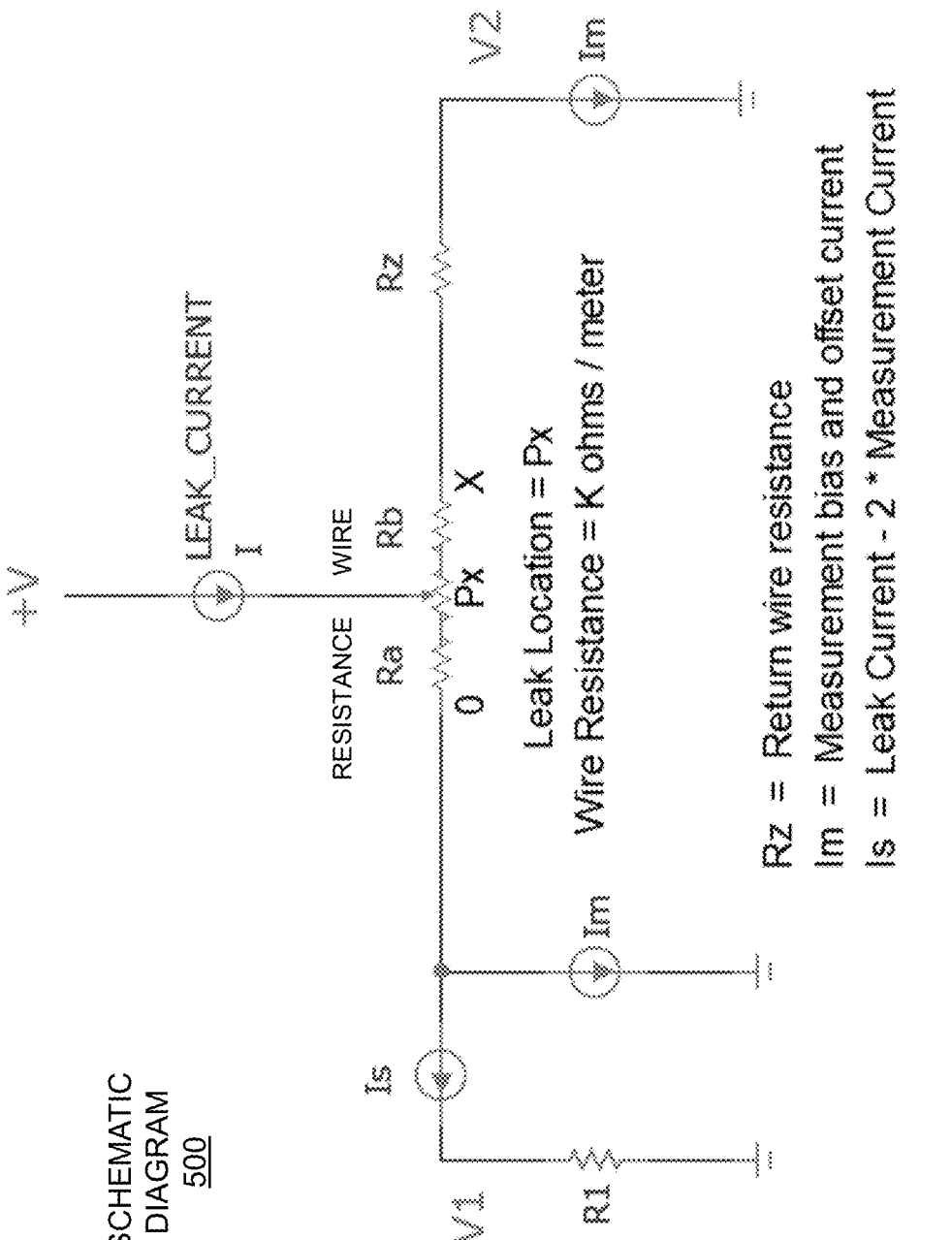
FIG. 5 depicts a schematic diagram illustrating inherent error sources of the traditional method shown in FIG. 3 and FIG. 4 in accordance with embodiments of the present disclosure.

FIG. 5 depicts a schematic diagram 500 illustrating inherent error sources of the traditional method shown in FIG. 3 and FIG. 4 in accordance with embodiments of the present disclosure. The resistance wire is represented as individual resistances Ra and Rb on either side of the leak location. The return wire resistance is represented as Rz, and the measurement bias currents are shown as Im. In practice, the resistance-per-unit-length (K) of the copper return wire is usually between 0.1% and 1.0% of the resistance wire's K.

Cable length X and resistance values for Rz and R1 are known, but Im is a variable parasitic current with only a maximum possible value known. Therefore, the uncompensated voltage error (V2_error) at V2 is proportional to Im and also to the leak location distance from the far end of the sense cable 102. V2_error can be calculated as Im*(Rz+Rb).

Measurement current can be held to less than 0.1% of the leak current, making its effect on Is relatively insignificant in most instances. However, as leak location distance Px (and therefore Ra) tends towards zero and Rb increases towards (X*K), V2 approaches an effective number of bits (ENOB) limitation for of the ADC, and the V2_error voltage begins to become significant with respect to V2. ENOB also includes noise, sample time, oversampling, and/or the like that limits or adjust resolution of the ADC. The common workaround for this is to specify a minimum distance limit in the product specifications.

The point of maximum signal-to-noise ratio (SNR) is achieved when the leak location is at the far end of the sense cable 102. At that point, the generated voltage across Ra is maximized because Ra=X*K, and V2_error is minimized because Rb=0. At this point, the total system error is mainly dependent on the tolerance limits of R1 and K.

Disclosed in the following embodiments are improved methods, systems, and devices for detecting and locating fluid leaks along a resistance cable (e.g., sense cable 102).

Figure 6:
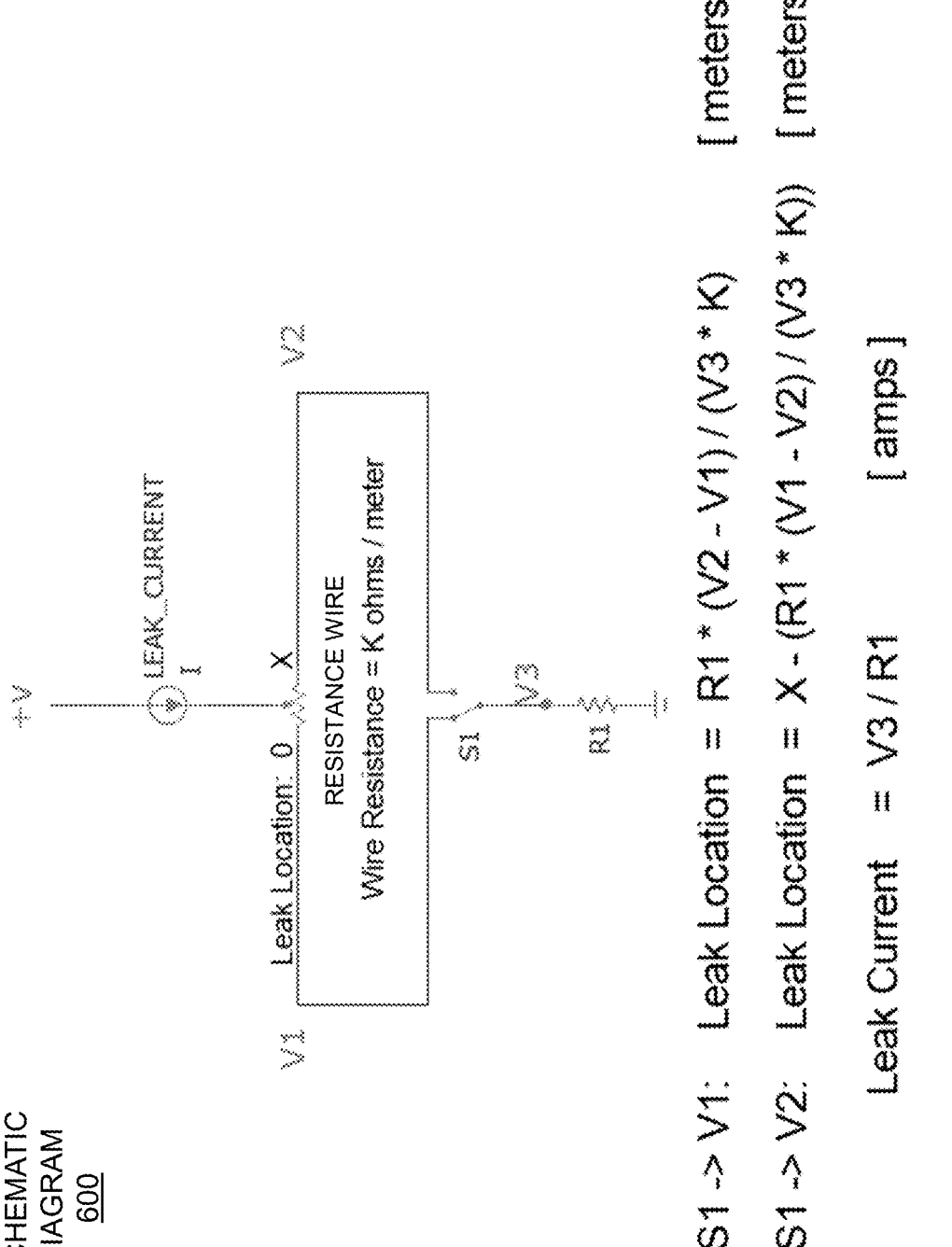
FIG. 6 depicts a schematic diagram illustrating a first embodiment for increasing accuracy over the traditional method using selectable current routing in accordance with embodiments of the present disclosure.

FIG. 6 depicts a schematic diagram 600 illustrating a first embodiment for increasing accuracy over the traditional method using selectable current routing in accordance with embodiments of the present disclosure. In this embodiment, the minimum leak location distance restriction can be eliminated, and the accuracy of the system at shorter distances can be greatly improved for leak locations less than the midpoint of the sense cable 102. This is achieved by rerouting the sense current Is from the near end to the far end of the sense cable 102 and exchanging the definitions of V1 and V2. This has the effect of maximizing the voltage signal level while simultaneously minimizing the current-induced measurement error (i.e., which maximizes the SNR). The material cost of this adaptation is insignificant, since it only involves the addition of two of low-leakage analog switches. In other embodiments, electromechanical switches may be used.

This dynamic reconfiguration can be achieved either by actually swapping the resistance wire connections with a double-pole-double-throw (DPDT) switch configuration, or more simply by having a single-pole-double-throw (SPDT) switch S1 configuration at V1 and V2 to select which point is connected to the current sense resistor (as shown if FIG. 6). Specifically, the addition of measurement point V3 avoids including the SPDT switch S1 impedance in any current or voltage measurement.

Sampling and then selecting whichever switch position produces the largest absolute value of the differential voltage (V2–V1) ensures that the system calculations use the signals with the highest possible SNR. Using this method, the point of minimum SNR occurs at exactly the midpoint along the cable 102, and SNR improves as the leak location tends toward either end. A minimum voltage signal at cable 102 midpoint can be calculated as (Is*X*K)/2. A maximum Im-induced error at cable 102 midpoint can be calculated as Im*(Rz+(K*X/2)).

Figure 7:
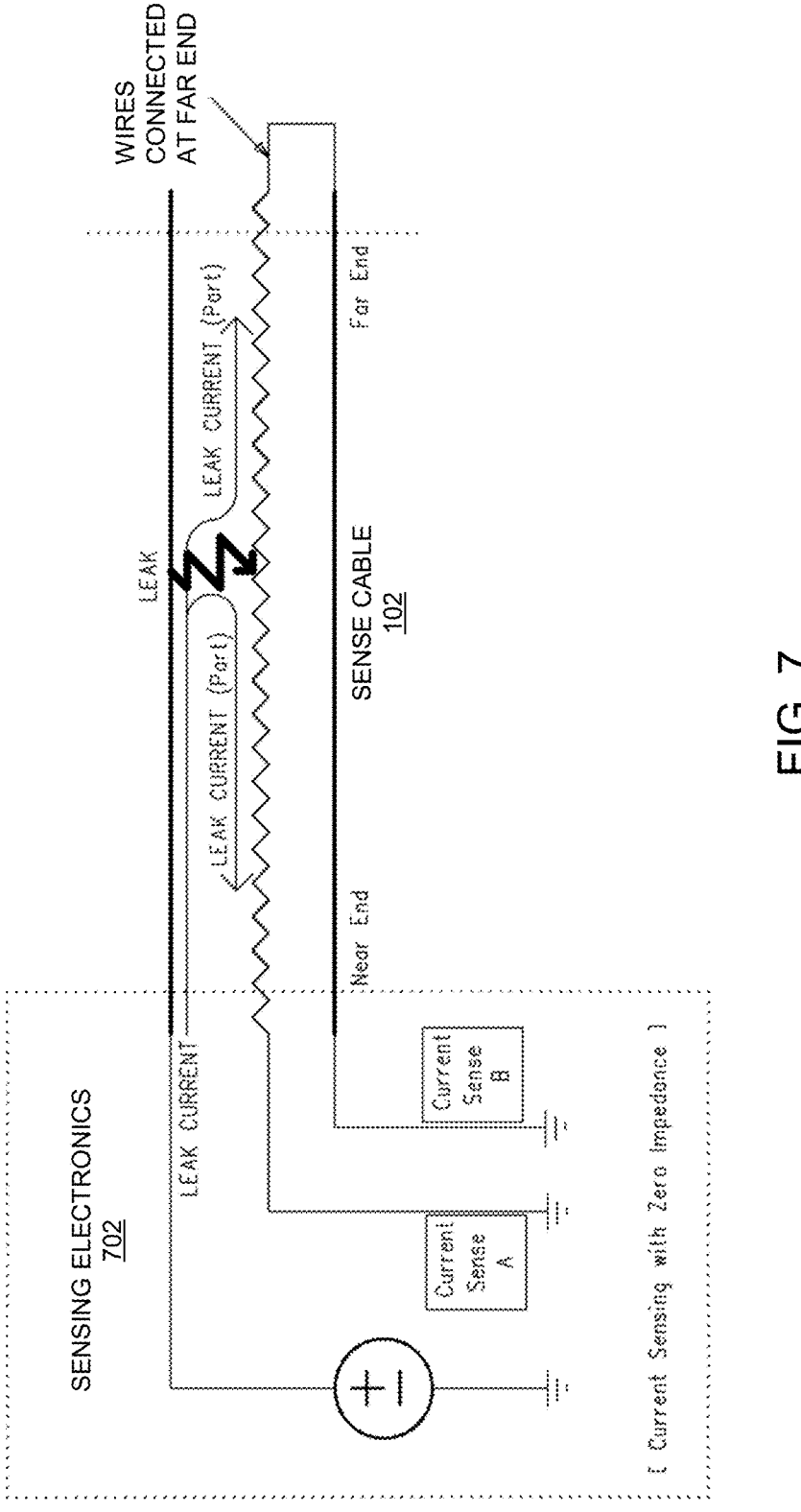
FIG. 7 depicts a schematic diagram illustrating a second embodiment for increasing accuracy over the traditional method using a simplified clamped bridge method in accordance with embodiments of the present disclosure.

FIG. 7 depicts a schematic diagram 700 illustrating a second embodiment for increasing accuracy over the traditional method using a simplified clamped bridge method in accordance with embodiments of the present disclosure. This clamped bridge method is optimized for shorter cable lengths (e.g., two meters to hundred meters). Principal advantages over the traditional method include but are not limited to the following:

Advantage 1: excels at measuring short distances while maintaining high accuracy.

Advantage 2: can work with SAR ADCs as are commonly found in many inexpensive microcontrollers.

Advantage 3: can yield good results with as little as fourteen bits ENOB in the ADC converter.

Advantage 4: does not require a high-impedance sense cable input to minimize measurement current errors. In fact, the cable measurement impedance is effectively zero for all currents under the current limit.

Advantage 5: does not require buffer amplifiers at or in the ADC inputs to prevent loading down high impedance signals.

Advantage 6: requires only one critical component (e.g., a dual op-amp) to limit any uncompensated errors, and two low temperature coefficient precision resistors to maintain high proportional accuracy over a wide temperature range.

Advantage 7: automatically adapts to any resistance-per-unit-length value for the resistance wire. This is because it operates by determining the leak location as a fractional portion of the entire sense cable length.

Advantage 8: much more tolerant of stray electromagnetic interference (EMI) currents induced onto the sense cable 102. For example, a parasitic current of 10 nanoamps (nA) produces less than 200 millimeters (mm) location error on a 100 meter sense cable with a 7 $\mu$A leak current.

As for an additional advantage, this method allows for much lower wire resistances to be used while maintaining good accuracy, provided connection and PCB layout losses are taken into consideration. Plain copper or aluminum wire could be used on longer lengths so long as the temperature differential from one part of the wire to another was not too extreme.

Schematic diagram 700 further depicts the sense cable 102 connected inside sensing electronics 702 such that both ends of the resistance wire are clamped to the exact same voltage (e.g., ground in this case). With both ends of the resistance wire having a low impedance path to ground, the leak current splits at the leak location with part of it flowing in each direction along the resistance wire away from the leak. By clamping each end of the resistance wire to the exact same voltage, the ratio of these two currents is equal to the ratio of the wire resistances along each path, which yields to the proportional distance of the leak along the length of the sense cable 102.

In order for this method to work, the current flowing from each end of the resistance wire must be measured without introducing any additional impedance or voltage offset. This can be accomplished by using a dual op-amp configured as a pair of trans-impedance amplifiers, with each trans-impedance amplifier creating a virtual ground to which the resistance wire ends are connected. The feedback resistors are selected to produce a range of voltages that matches the range of leak currents with the input voltage range of the ADC without additional amplification. Unlike a purely resistive bridge circuit, the accuracy of this clamped bridge method is independent of the impedance ratios of the measurement resistors to the wire resistances. The proportional accuracy of this method is based only on the ratio of the two feedback resistors to each other. This allows their resistances to be two to three orders of magnitude greater than the wire resistances.

Figure 8:
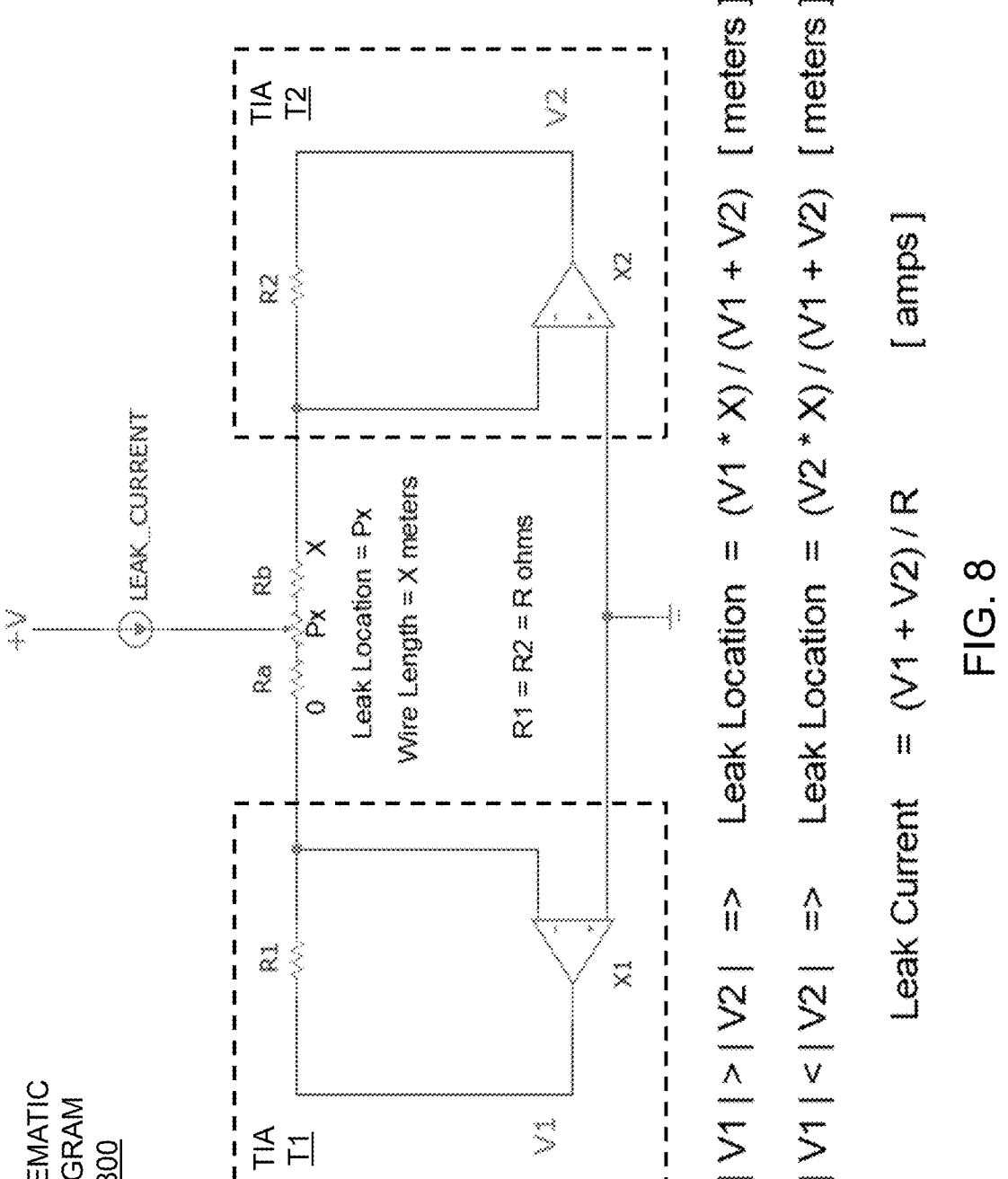
FIG. 8 depicts a schematic diagram further illustrating the clamped bridge method of FIG. 7 using a first trans-impedance amplifier and a second transimpedance amplifier in accordance with embodiments of the present disclosure.

FIG. 8 depicts a schematic diagram 800 further illustrating the clamped bridge method of FIG. 7 using a first trans-impedance amplifier (TIA) T1 and a second TIA T2 in accordance with embodiments of the present disclosure.

TIA T1 and TIA T2 each generate an output voltage directly proportional to their input current. On a practical level, this part should be a dual op-amp with low offset voltage and low bias current so that the TIA inputs (and therefore both ends of the resistance wire) are held at nearly the same exact voltage. Worst-case values of 10 microvolts ($\mu$V) and 200 picoamps (pA) are more than adequate for this application. Op-amps such as the Analog Devices® LTC2064 are moderately priced and readily available. An important aspect of the TIA T1 and TIA T2 is that they present an effectively zero input impedance to the sense cable 102 connections. So, controlling EMI susceptibility is much easier than with the traditional detection method.

Resistor values R1 and R2 are chosen to match the full-scale input of the ADC with the maximum current limit of the Leak current, allowing full range operation without additional amplification. Op-amp outputs at V1 and V2 provide low impedance signals directly to the ADC, isolating the sensitive TIA inputs from any interference or loading by the converter.

When a leak occurs on the sense cable 102, the leak current splits at the leak location, with part flowing to the near end (via the Ra portion of the resistance wire) and the rest flowing to the far end (via Rb). Since TIA T1 and TIA T2 hold both ends of the sense cable 102 at the same voltage, the proportion of the leak current going through Ra vs Rb is determined solely by their relative resistances. TIA T1 and TIA T2 each linearly convert the current at the associated cable end into a voltage that can be read directly by the ADC, when determining the leak location. This method can use either the near or the far end of the sense cable 102 as its reference point, depending on which computation yields the better SNR ratio result.

Figure 9:
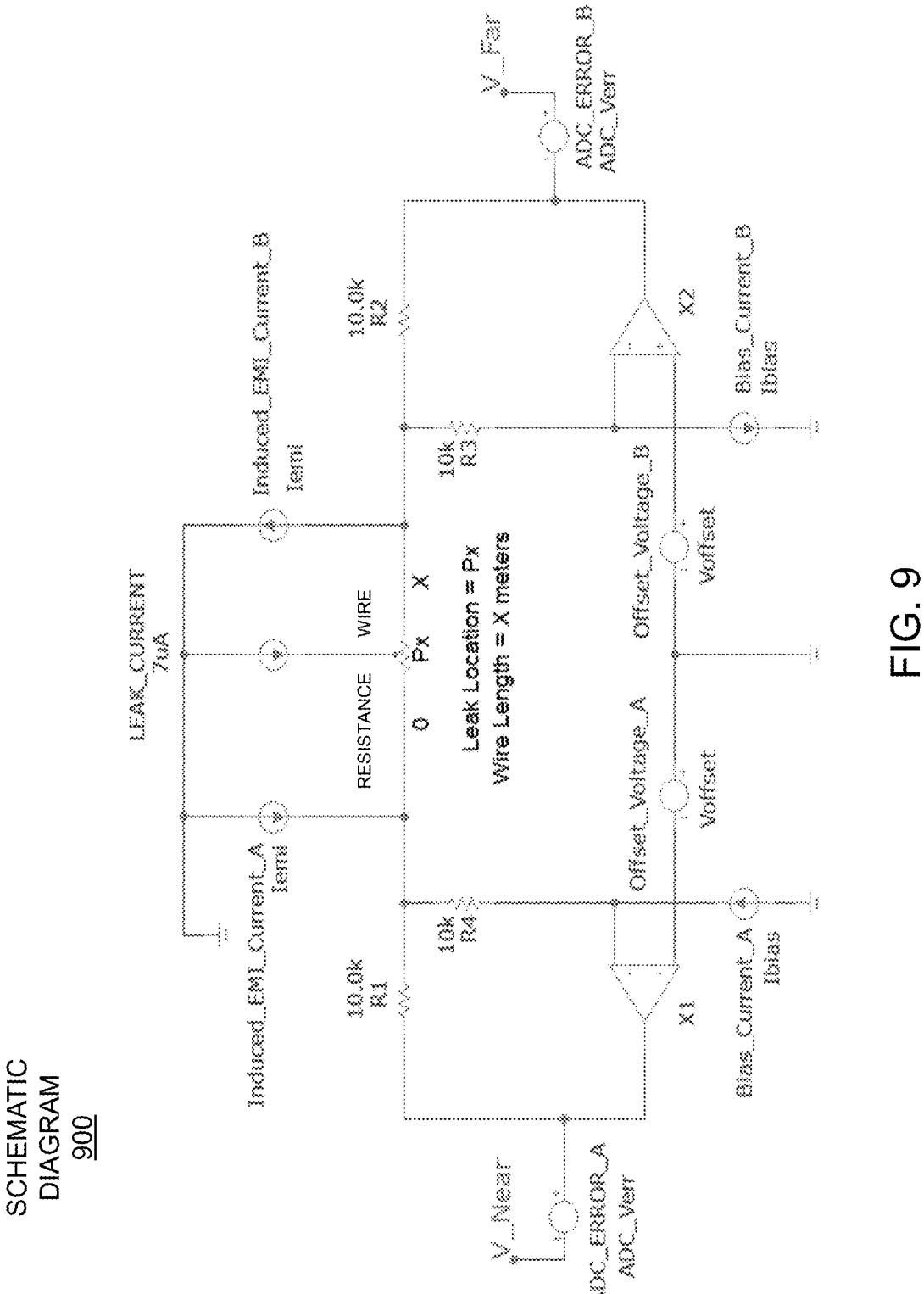
FIG. 9 depicts a schematic diagram further illustrating the schematic diagram of FIG. 8 using the clamped bridge circuitry with error sources represented in accordance with embodiments of the present disclosure.

FIG. 9 depicts a schematic diagram 900 further illustrating the schematic diagram 800 of FIG. 8 using the clamped bridge circuitry with error sources represented in accordance with embodiments of the present disclosure. In order to demonstrate extreme worst case conditions, each error source is oriented to affect each TIA in the opposite direction. This ensures that each error component affect TIA T1 and TIA T2 equally and is cumulative in its effect. The input offset voltage of the op-amp is shown as Voffset. The sum of the input bias current and input offset current of the op-amp is shown as Ibias. A voltage offset equivalent to a one bit error at the ADC's specified ENOB limit is shown as ADC_Verr. An EMI induced current flowing in the resistance wire loop is shown as Iemi. An imbalance between the value R1 and R2 creates a proportional error.

Uncompensated errors in the TIA op-amps are expressed as a voltage differential between the sense cable ends. This forces an error in the calculated leak location. Voffset and Ibias are positioned to act directly in this manner while allowing the TIA op-amps to be treated as ideal components.

ADC resolution and accuracy errors are expressed as an error voltage at each ADC input equivalent to 1 bit at the ENOB limit. For instance, a converter with a 14-bit ENOB and 3.3 volt full scale input will have an error voltage of 201 uV in opposite polarities applied at each input.

Resistors R3 and R4 exist in the practical circuit to protect the op-amp inputs from physical damage due to electrostatic discharge (ESD) and EMI coming from the sense cable wire connections. Since they interact with Ibias, they are shown here as part of the error current source Error current Iemi can be induced by EMI. It is a parasitic current flowing where there is no clearly defined connection or electromotive force.

Voffset and Ibias each induce a fixed offset in the resulting distance calculation. This offset is not dependent upon either the length of the sense cable 102 or the location of the leak.

ENOB limit errors, Iemi, and R1/R2 imbalance each induce an error that is proportional to the length of the sense cable 102, but only the R1/R2 imbalance error has an additional dependence on the leak location distance from either end of the sense cable 102.

Figure 10:
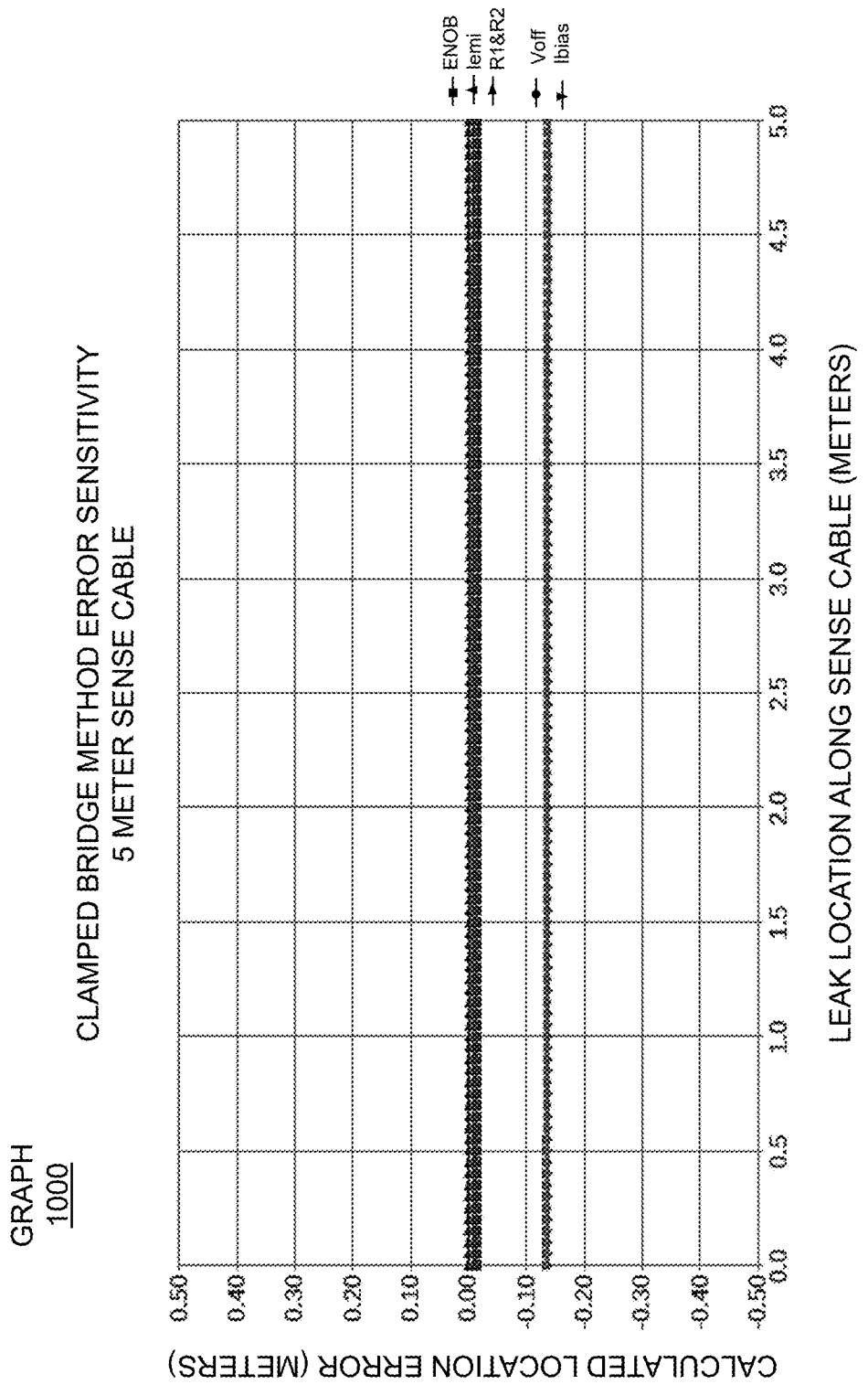
FIG. 10 depicts a graph illustrating a calculated location error versus a leak location using a simulation of the circuit diagram of FIG. 9 for a five meter sense cable in accordance with embodiments of the present disclosure.
Figure 11:
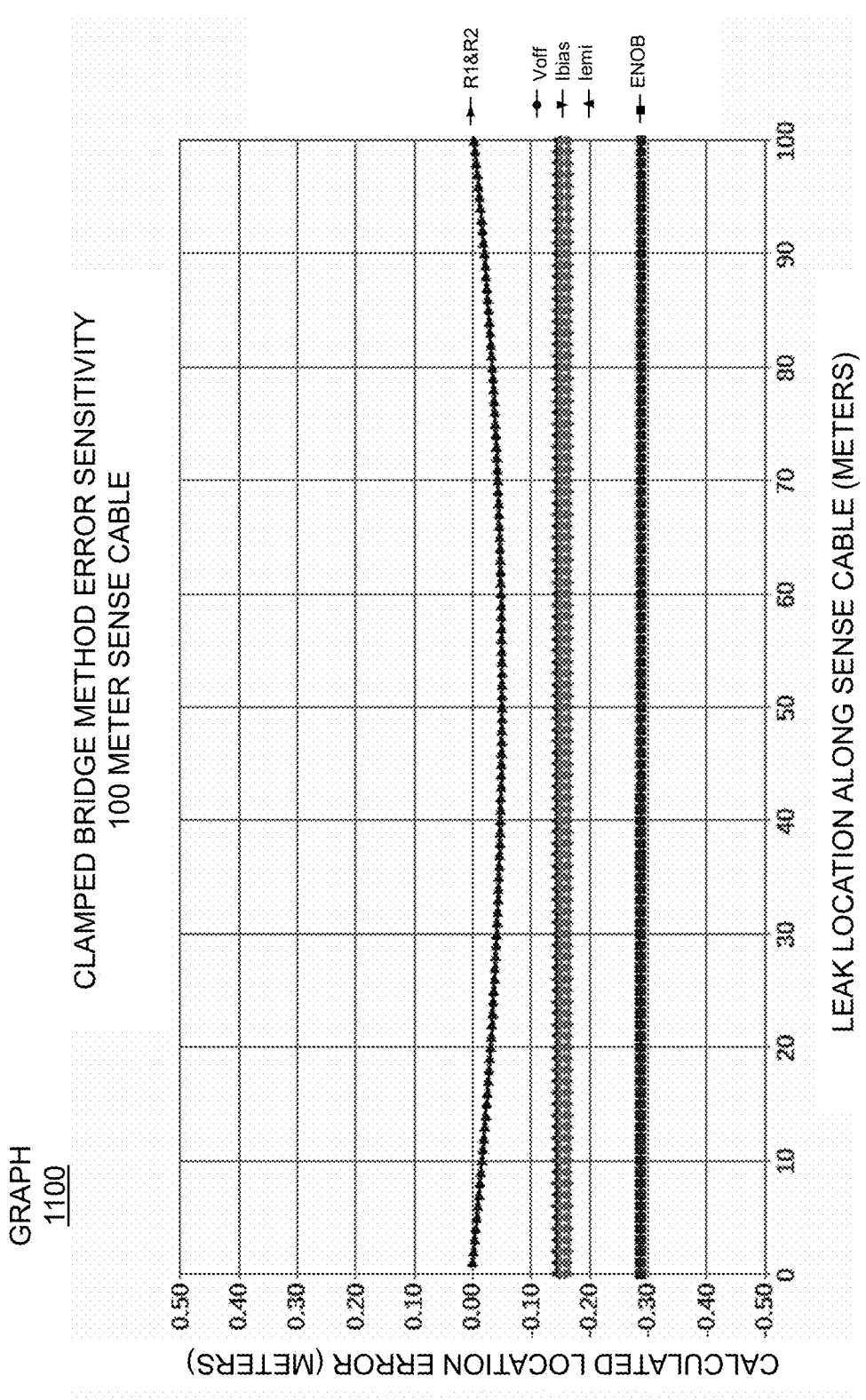
FIG. 11 depicts a graph illustrating a calculated location error versus a leak location using a simulation of the circuit diagram of FIG. 9 for a one hundred meter sense cable in accordance with embodiments of the present disclosure.

FIG. 10 depicts a graph 1000 illustrating a calculated location error versus a leak location using a simulation of the circuit diagram 900 of FIG. 9 for a five meter sense cable in accordance with embodiments of the present disclosure. FIG. 11 depicts a graph 1100 illustrating a calculated location error versus a leak location using a simulation of the circuit diagram 900 of FIG. 9 for a one hundred meter sense cable in accordance with embodiments of the present disclosure. The simulations of FIG. 10 and FIG. 11 demonstrate robustly consistent operation in the face of these known voltage and current error sources as well as tolerance and resolution limits common to inexpensive components.

For these simulations, leak current is set at 7 uA, ENOB error is set at 14 bit limit, Voffset is set at 10 uV, Ibias is set at 1.0 nA, and Iemi is set at 10 nA. Additionally, an R1 and R2 imbalance is set to 0.2% (0.1% on each resistor in opposite directions).

The clamped bridge can be used with longer distance sense cables with the addition of a DPDT switch that swaps which TIA is connected to each end of the sense cable 102. By taking two readings for each measurement, swapping the wires between readings, then averaging the results, all errors associated with each amplifier circuit are effectively canceled out. Only the EMI and ADC ENOB errors remain, since they exist outside of TIA T1 and TIA T2. The DPDT switch may be a low-leakage analog DPDT switch or an electromechanical DPDT switch.

Figure 12:
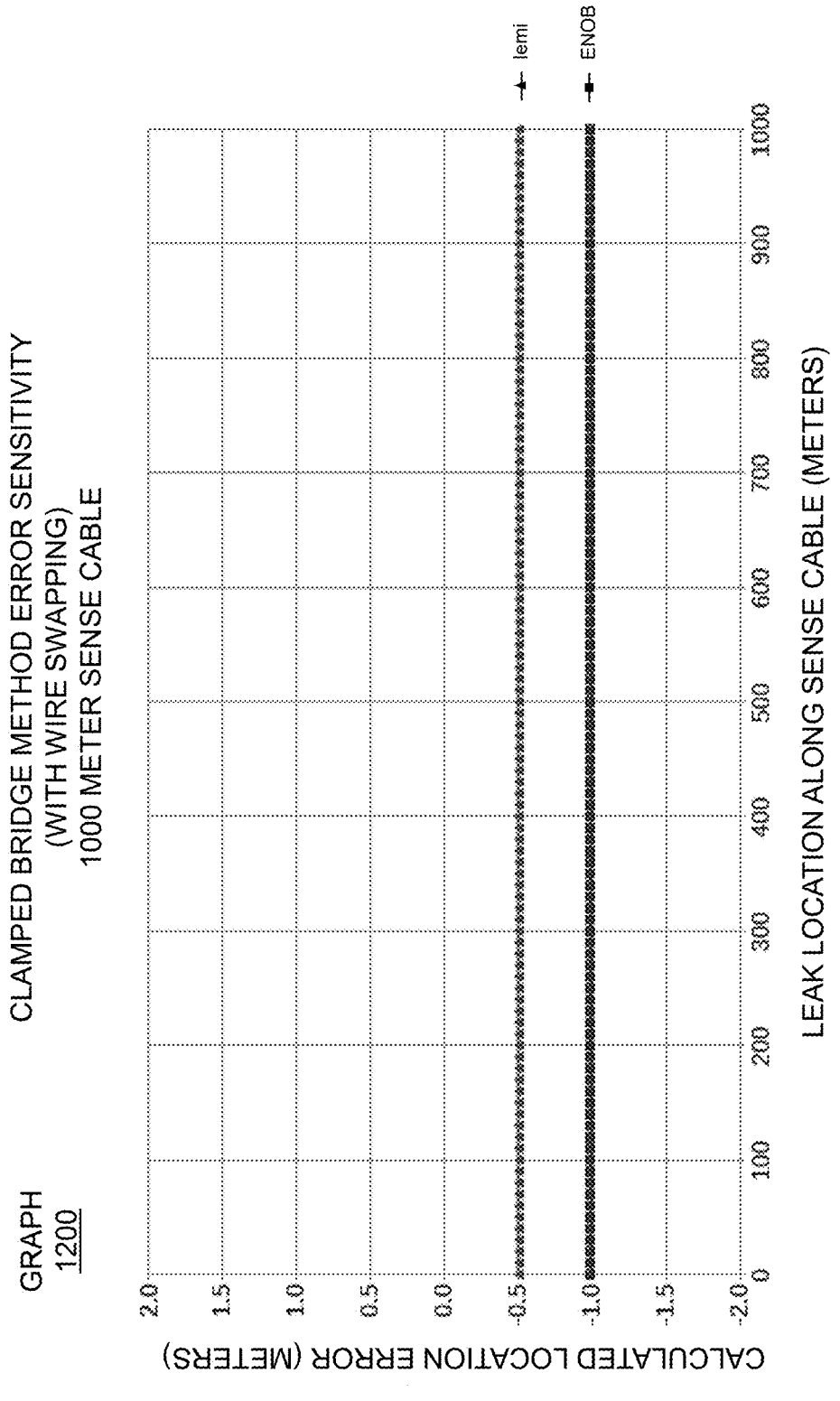
FIG. 12 depicts a graph illustrating a calculated location error versus a leak location using a simulation of the circuit diagram of FIG. 9 for a one thousand meter sense cable in accordance with embodiments of the present disclosure.

FIG. 12 depicts a graph 1200 illustrating a calculated location error versus a leak location using a simulation with TIA T1 and TIA T2 of the circuit diagram 900 of FIG. 9 for a one thousand meter sense cable in accordance with embodiments of the present disclosure. Leak current is set at 7 uA, ENOB error is set at 14 bit limit, and Iemi is set at 10 nA.

Figure 13:
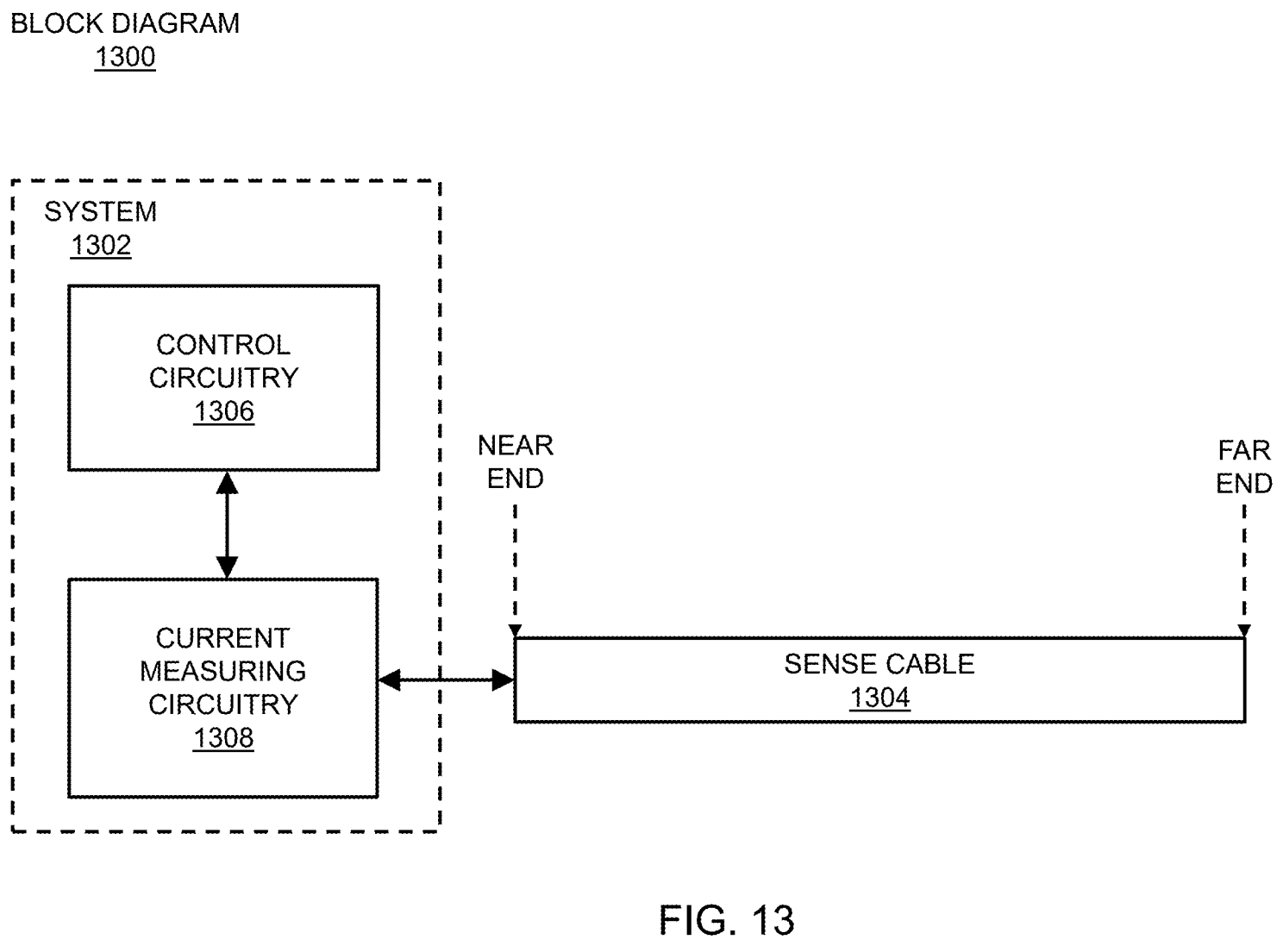

In broader embodiments, FIG. 13 depicts a block diagram 1300 illustrating a system 1302 for monitoring the sense cable 1304 in accordance with embodiments of the present disclosure. The system 1302 includes control circuitry 1306 and current measurement circuitry 1308 coupled with the control circuitry 1306. In some embodiments, the system 1302 may further include a connector and/or a terminal block for electrically coupling the sense cable 1304 with the current monitoring circuitry.

FIG. 14 depicts a flowchart 1400 illustrating a method performed by the control circuitry 1306 of FIG. 13 in accordance with embodiments of the present disclosure.

In step 1402, the method includes determining a first current value of a first measured leak current at a near end of the resistance wire.

In step 1404, the method further includes determining a second current value of a second measured leak current at a far end of the resistance wire. In some embodiments, the sense cable 1304 may further include a return wire and the current measuring circuitry may be configured for electrically coupling with the far end of the resistance wire via the return wire.

In step 1406, the method further includes determining an approximate location of a leak coupling via a fluid between the source wire and the resistance wire based on the first current value, the second current value, and a resistance parameter of the resistance wire.

The resistance parameter may include one or more of a resistance-per-unit-length, a length, and/or a total resistance of the resistance wire.

In step 1408, the method may further include providing an indication of the approximate location via a user interface and/or a communication interface (not shown in FIG. 13). In some embodiments, the control circuitry may be further configured for receiving the resistance parameter from the communication interface and/or the user interface.

In some embodiments, the communication interface includes an Ethernet interface, an RS-232 interface, an RS-422 interface, a Wi-Fi interface, a Bluetooth® interface, a universal serial bus (USB) interface, a controller area network (CAN) bus interface, and/or the like.

In some embodiments, the user interface may include a touch pad, a liquid-crystal display (LCD), a plurality of light emitting diodes (LEDs), and/or the like.

In some embodiments, the control circuitry 1306 may include a microcontroller, a proportional-integral-derivative (PID) controller, a programmable logic controller (PLC), an industrial personal computer (IPC), a distributed control system (DCS), a programmable automation controller (PAC), a remote terminal unit (RTU) and/or the like. The control circuitry may be configured for supervisory control and data acquisition (SCADA).

The control circuitry 1306 (e.g., a microcontroller) and/or the current measuring circuitry 1308 may include at least one integral single-ended SAR ADC configured for measuring one or more resistors to determine the first current value and the second current value.

In some embodiments, the current measurement circuitry 1308 may include switch circuitry and the control circuitry 1306 may be further configured for (1) when determining the first current value of the first measured leak current at the near end of the resistance wire, electrically decoupling the current measurement circuitry from the far end of the resistance wire via the switch circuitry and electrically coupling the current measurement circuitry to the near end of the resistance wire via the switch circuitry; and (2) when determining the second current value of the second measured leak current at the far end of the resistance wire, electrically decoupling the current measurement circuitry from the near end of the resistance wire via the switch circuitry and electrically coupling the current measurement circuitry to the far end of the resistance wire via the switch circuitry.

In some embodiments, determining the approximate location may be further based on at least one of a bias voltage and a ground applied to the source wire.

In some embodiments, the system 1302 may further include voltage monitoring circuitry coupled with the control circuitry. In further embodiments, the current measuring circuitry may include a current sink resistor. The control circuitry 1306 may be further configured for determining the first current value based on measuring a first voltage across the current sink resistor and determining the second current value based on measuring a second voltage across the current sink resistor.

In other embodiments, the current measuring circuitry 1308 includes a first current sink resistor and a second current sink resistor. The control circuitry 1306 is further configured for determining the first current value based on measuring a first voltage across the first current sink resistor and determining the second current value based on measuring a second voltage across the second current sink resistor.

In other embodiments, the current measurement circuitry 1308 may be configured for simultaneously providing a first virtual threshold to the near end of the resistance wire and a second virtual threshold to the far end of the resistance wire (as shown in FIG. 8). Additionally, the first virtual threshold may be approximately equal to the second virtual threshold. In further embodiments, the first virtual threshold and the second virtual threshold may be approximately equal to a ground threshold. In other embodiments, the first virtual threshold and the second virtual threshold may be approximately equal to a positive voltage reference or a negative voltage reference.

In further embodiments, the current measuring circuitry 1308 may include a first transimpedance and a second transimpedance amplifier. The first transimpedance amplifier may be configured for providing the first virtual threshold and the second transimpedance amplifier may be configured for providing the second virtual threshold.

In still further embodiments, the first transimpedance amplifier may include a first feedback resistive element and the second transimpedance amplifier may include a second feedback resistive element. The control circuitry 1306 may be further configured for determining the first current value based on measuring a first voltage across the first feedback resistive element via voltage monitoring circuitry and determining the second current value based on measuring a second voltage across the second feedback resistive element via the voltage monitoring circuitry. In certain embodiments, the first feedback resistive element and the second feedback resistive element may be resistors.

In other embodiments, the system may also include voltage monitoring circuitry coupled with the control circuitry. The current measuring circuitry 1308 may include a first transimpedance amplifier that includes a first feedback resistor, a second transimpedance amplifier that includes a second feedback resistor, and switch circuitry. The switch circuitry may be configured to have a first state and a second state.

When in the first state, the switch circuitry may be configured for electrically decoupling the first transimpedance amplifier from the far end of the resistance wire, electrically decoupling the second transimpedance amplifier from the near end of the resistance wire, electrically coupling the first transimpedance amplifier to the near end of the resistance wire to provide the first virtual threshold, and electrically coupling the second transimpedance amplifier to the far end of the resistance wire to provide the second virtual threshold.

When in the second state, the switch circuitry may be configured for electrically decoupling the first transimpedance amplifier from the near end of the resistance wire, electrically decoupling the second transimpedance amplifier from the far end of the resistance wire, electrically coupling the first transimpedance amplifier to the far end of the resistance wire to provide the second virtual threshold, and electrically coupling the second transimpedance amplifier to the near end of the resistance wire to provide the first virtual threshold.

In further embodiments, the control circuitry 1306 may be further configured for configuring the switch circuitry to the first state, determining a first near end current value based on measuring a first near end voltage across the first feedback resistor when in the first state, and determining a first far end current value based on measuring a first far-end voltage across the second feedback resistor when in the first state.

In still further embodiments, the control circuitry 1306 may be further configured for configuring the switch circuitry to the second state, determining a second near end current value based on measuring a second near end voltage across the second feedback resistor when in the second state, and determining a second far end current value based on measuring a second far-end voltage across the first feedback resistor when in the second state.

In still further embodiments, determining the first current value of the first measured leak current at the near end of the resistance wire may be based on the first near end current value and the second near end current value, and determining the second current value of the second measured leak current at the far end of the resistance wire may be based on the first far end current value and the second far end current value.

In some embodiments the switch circuit may include electromechanical switch circuitry and/or analog switch circuitry.

In some embodiments, the method of FIG. 14 may be stored as instructions on a non-transitory computer-readable storage medium.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. For example, programming languages may include, but are not limited to: Ruby, JavaScript, Java, Python, Ruby, PHP, C, C++, C#, Objective-C, Go, Scala, Swift, Kotlin, OCaml, or the like.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for monitoring a sense cable that comprises a source wire and a resistance wire, the system comprising:
   control circuitry;
   current measurement circuitry coupled with the control circuitry, wherein the control circuitry is configured for:
      determining a first current value of a first measured leak current at a near end of the resistance wire;
      determining a second current value of a second measured leak current at a far end of the resistance wire; and
      determining an approximate location of a leak coupling via a fluid between the source wire and the resistance wire based on the first current value, the second current value, and a resistance parameter of the resistance wire, wherein:
         the current measurement circuitry is configured for simultaneously providing:
            a first virtual threshold to the near end of the resistance wire; and
            a second virtual threshold to the far end of the resistance wire; and
         the first virtual threshold is approximately equal to the second virtual threshold.

2. The system of claim 1, wherein:
   the first virtual threshold is approximately equal to a ground threshold; and
   the second virtual threshold is approximately equal to the ground threshold.

3. The system of claim 1, wherein:
   the current measuring circuitry comprises a first transimpedance amplifier and a second transimpedance amplifier;
   the first transimpedance amplifier is configured for providing the first virtual threshold; and
   the second transimpedance amplifier is configured for providing the second virtual threshold.

4. The system of claim 3 further comprising voltage monitoring circuitry coupled with the control circuitry, wherein:
   the first transimpedance amplifier comprises a first feedback resistor;
   the second transimpedance amplifier comprises a second feedback resistor; and

the control circuitry is further configured for:
  determining the first current value based on measuring a first voltage across the first feedback resistor; and
  determining the second current value based on measuring a second voltage across the second feedback resistor.

5. The system of claim 4, wherein the voltage monitoring circuitry comprises at least one single-ended successive-approximation (SAR) analog-to-digital converter (ADC).

6. The system of claim 1 further comprising voltage monitoring circuitry coupled with the control circuitry, wherein:
  the current measuring circuitry comprises:
    a first transimpedance amplifier comprising a first feedback resistor,
    a second transimpedance amplifier comprising a second feedback resistor; and
    switch circuitry configured for:
      when in a first state:
        electrically decoupling the first transimpedance amplifier from the far end of the resistance wire;
        electrically decoupling the second transimpedance amplifier from the near end of the resistance wire;
        electrically coupling the first transimpedance amplifier to the near end of the resistance wire to provide the first virtual threshold; and
        electrically coupling the second transimpedance amplifier to the far end of the resistance wire to provide the second virtual threshold;
      and
      when in a second state:
        electrically decoupling the first transimpedance amplifier from the near end of the resistance wire;
        electrically decoupling the second transimpedance amplifier from the far end of the resistance wire;
        electrically coupling the first transimpedance amplifier to the far end of the resistance wire to provide the second virtual threshold; and
        electrically coupling the second transimpedance amplifier to the near end of the resistance wire to provide the first virtual threshold;
    and
    the control circuitry is further configured for:
      configuring the switch circuitry to the first state;
      determining a first near end current value based on measuring a first near end voltage across the first feedback resistor when in the first state; and
      determining a first far end current value based on measuring a first far-end voltage across the second feedback resistor when in the first state;
      configuring the switch circuitry to the second state;
      determining a second near end current value based on measuring a second near end voltage across the second feedback resistor when in the second state; and
      determining a second far end current value based on measuring a second far-end voltage across the first feedback resistor when in the second state, wherein:
      determining the first current value of the first measured leak current at the near end of the resistance wire is based on the first near end current value and the second near end current value; and
      determining the second current value of the second measured leak current at the far end of the resistance wire is based on the first far end current value and the second far end current value.

7. The system of claim 1, wherein:
  the sense cable further comprises a return wire; and
  and the current measuring circuitry is configured for electrically coupling with the far end of the resistance wire via the return wire.

8. The system of claim 1, wherein the control circuitry includes at least one microcontroller, and the microcontroller includes at least one integral single-ended successive-approximation (SAR) analog-to-digital converter (ADC) configured for measuring one or more resistors to determine the first current value and the second current value.

9. The system of claim 1 further comprising a user interface coupled with the control circuitry, wherein the control circuitry is further configured for providing an indication of the approximate location via the user interface.

10. The system of claim 1 further comprising a communication interface coupled with the control circuitry, wherein the control circuitry is further configured for providing an indication of the approximate location via the communication interface.

11. The system of claim 10, wherein the communication interface comprises at least one of an Ethernet interface, an RS-232 interface, an RS-422 interface, a Wi-Fi interface, a Bluetooth® interface, a universal serial bus (USB) interface, and a controller area network (CAN) bus interface.

12. The system of claim 1, wherein the control circuitry is further configured for receiving the resistance parameter from one of a communication interface and a user interface.

13. The system of claim 1 further, wherein the resistance parameter comprises one or more of a resistance-per-unit-length, a length, and/or a total resistance of the resistance wire.

14. A system for monitoring a sense cable that comprises a source wire and a resistance wire, the system comprising:
  control circuitry;
  current measurement circuitry coupled with the control circuitry, wherein the control circuitry is configured for:
    determining a first current value of a first measured leak current at a near end of the resistance wire;
    determining a second current value of a second measured leak current at a far end of the resistance wire; and
    determining an approximate location of a leak coupling via a fluid between the source wire and the resistance wire based on the first current value, the second current value, and a resistance parameter of the resistance wire, wherein:
    the current measurement circuitry comprises switch circuitry; and
    the control circuitry is further configured for:
      when determining the first current value of the first measured leak current at the near end of the resistance wire, electrically decoupling the current measurement circuitry from the far end of the resistance wire via the switch circuitry and electrically coupling the current measurement circuitry to the near end of the resistance wire via the switch circuitry; and
      when determining the second current value of the second measured leak current at the far end of the resistance wire, electrically decoupling the current measurement circuitry from the near end of the resistance wire via the switch circuitry and electrically coupling the current measurement circuitry to the far end of the resistance wire via the switch circuitry.

15. The system of claim 14, wherein determining the approximate location is further based on at least one of a bias voltage and a ground applied to the source wire.

16. The system of claim 14 further comprising voltage monitoring circuitry coupled with the control circuitry, wherein:

the current measuring circuitry includes a current sink resistor; and the control circuitry is further configured for:

determining the first current value based on measuring a first voltage across the current sink resistor; and determining the second current value based on measuring a second voltage across the current sink resistor.

17. The system of claim 14 further comprising voltage monitoring circuitry coupled with the control circuitry, wherein:

the current measuring circuitry includes a first current sink resistor and a second current sink resistor; and the control circuitry is further configured for:

determining the first current value based on measuring a first voltage across the first current sink resistor; and determining the second current value based on measuring a second voltage across the second current sink resistor.

18. A method implemented on at least one processor for monitoring a sense cable that comprises a source wire and a resistance wire, the method comprising:

determining a first current value of a first measured leak current at a near end of the resistance wire via current monitoring circuitry;

determining a second current value of a second measured leak current at a far end of the resistance wire via the current monitoring circuitry;

determining an approximate location of a leak coupling via a fluid between the source wire and the resistance wire based on the first current value, the second current value, and resistance parameter of the resistance wire; and providing an indication of the approximate location via at least one of a user interface and a communication interface, wherein:

the current measurement circuitry is configured for simultaneously providing:

a first virtual threshold to the near end of the resistance wire; and a second virtual threshold to the far end of the resistance wire;

and the first virtual threshold is approximately equal to the second virtual threshold.

19. A non-transitory computer-readable storage medium storing instructions to be implemented by at least one processor, the instructions when executed by the at least one processor provide a method for monitoring a sense cable that comprises a source wire and a resistance wire, the method comprising:

determining a first current value of a first measured leak current at a near end of the resistance wire via current monitoring circuitry;

determining a second current value of a second measured leak current at a far end of the resistance wire via the current monitoring circuitry;

determining an approximate location of a leak coupling via a fluid between the source wire and the resistance wire based on the first current value, the second current value, and a resistance parameter of the resistance wire; and providing an indication of the approximate location via at least one of a user interface and a communication interface, wherein:

the current measurement circuitry is configured for simultaneously providing:

a first virtual threshold to the near end of the resistance wire; and a second virtual threshold to the far end of the resistance wire;

and the first virtual threshold is approximately equal to the second virtual threshold.

20. A method implemented on at least one processor for monitoring a sense cable that comprises a source wire and a resistance wire, the method comprising:

determining a first current value of a first measured leak current at a near end of the resistance wire via current monitoring circuitry;

determining a second current value of a second measured leak current at a far end of the resistance wire via the current monitoring circuitry;

determining an approximate location of a leak coupling via a fluid between the source wire and the resistance wire based on the first current value, the second current value, and resistance parameter of the resistance wire; and providing an indication of the approximate location via at least one of a user interface and a communication interface, wherein:

the current measurement circuitry comprises switch circuitry; and the control circuitry is further configured for:

when determining the first current value of the first measured leak current at the near end of the resistance wire, electrically decoupling the current measurement circuitry from the far end of the resistance wire via the switch circuitry and electrically coupling the current measurement circuitry to the near end of the resistance wire via the switch circuitry; and when determining the second current value of the second measured leak current at the far end of the resistance wire, electrically decoupling the current measurement circuitry from the near end of the resistance wire via the switch circuitry and electrically coupling the current measurement circuitry to the far end of the resistance wire via the switch circuitry.

21. A non-transitory computer-readable storage medium storing instructions to be implemented by at least one processor, the instructions when executed by the at least one processor provide a method for monitoring a sense cable that comprises a source wire and a resistance wire, the method comprising:

determining a first current value of a first measured leak current at a near end of the resistance wire via current monitoring circuitry;

determining a second current value of a second measured leak current at a far end of the resistance wire via the current monitoring circuitry;

determining an approximate location of a leak coupling via a fluid between the source wire and the resistance wire based on the first current value, the second current value, and a resistance parameter of the resistance wire; and providing an indication of the approximate location via at least one of a user interface and a communication interface, wherein:

the current measurement circuitry comprises switch circuitry; and the control circuitry is further configured for:

when determining the first current value of the first measured leak current at the near end of the resistance wire, electrically decoupling the current measurement circuitry from the far end of the resistance wire via the switch circuitry and electrically coupling the current measurement circuitry to the near end of the resistance wire via the switch circuitry; and when determining the second current value of the second measured leak current at the far end of the resistance wire, electrically decoupling the current measurement circuitry from the near end of the resistance wire via the switch circuitry and electrically coupling the current measurement circuitry to the far end of the resistance wire via the switch circuitry.

\* \* \* \* \*